G. H. LANGTON & J. W. SMALL.
FLEXIBLE PIPE COUPLING.
APPLICATION FILED FEB. 27, 1917.
1,263,777. Patented Apr. 23, 1918.
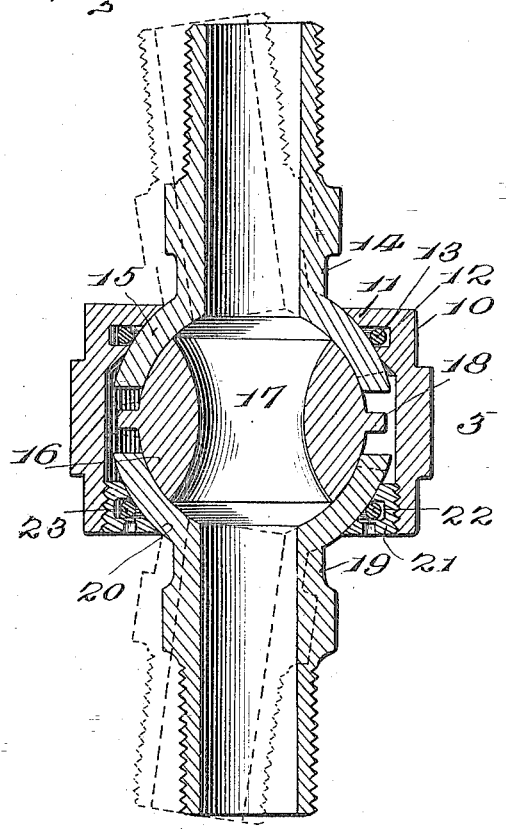
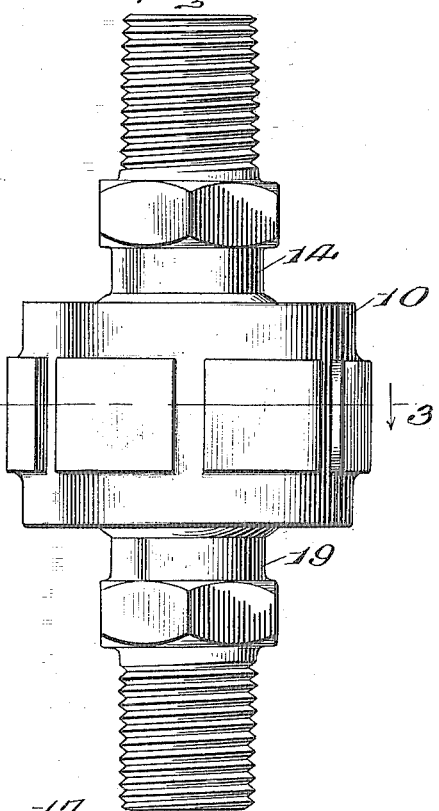
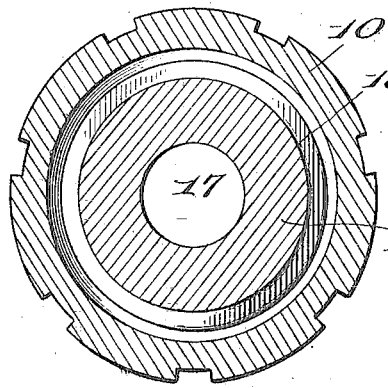
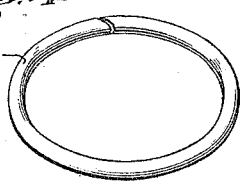
Inventor
G. H. Langton
J. W. Small
By
Attorneys

UNITED STATES PATENT OFFICE.

GEORGE H. LANGTON AND JOHN W. SMALL, OF PORTSMOUTH, VIRGINIA.

FLEXIBLE PIPE-COUPLING.

1,263,777. Specification of Letters Patent. Patented Apr. 23, 1918.

Application filed February 27, 1917. Serial No. 151,315.

*To all whom it may concern:*

Be it known that we, GEORGE H. LANGTON and JOHN W. SMALL, citizens of the United States, residing at Portsmouth, in the county of Norfolk and State of Virginia, have invented certain new and useful Improvements in Flexible Pipe-Couplings, of which the following is a specification.

This invention relates to an improved flexible pipe coupling and has as its primary object to provide a device of this character wherein a tight joint will be maintained between the coacting pipe sections of the coupling without the use of package or gaskets and wherein the said pipe sections will be mounted to rotate or oscillate independently with respect to each other.

The invention has as a further object to provide a coupling wherein the coacting pipe sections of the device will be held under spring tension tending to constantly urge the relatively movable parts of the coupling into tight engagement with each other and also acting to tension the pipe sections in their oscillatory and rotary movement.

And the invention has as a still further object to provide a coupling adapted for general application and so constructed that the coupling may be used upon steam pipes, air pipes, hot water pipes and the like with equal efficiency.

Other and incidental objects will appear as the description proceeds and in the drawings wherein we have illustrated the preferred embodiment of the invention and wherein similar reference characters designate corresponding parts throughout the several views:

Figure 1 is a sectional view particularly showing the mounting of the coacting pipe sections of the coupling and illustrating the arrangement of the bearing member interposed between the said pipe sections, Fig. 2 is a side elevation of the coupling, Fig. 3 is a transverse sectional view taken on the line 3—3 of Fig. 2, and Fig. 4 is a detailed perspective view showing the bearing member detached and illustrating one of the rings employed for tensioning the pipe sections of the coupling.

In carrying out the invention, we employ a hollow cylindrical casing or body 10 preferably formed on its outer face with a series of circumferentially spaced wrench receiving lugs. Projecting into the body, at one end thereof, is an annular shoulder 11 provided with an inner curved bearing face or seat and formed in the said shoulder substantially midway the side edges thereof, is an annular channel or groove 12. Fitting loosely in the said groove is a split resilient tensioning ring or member 13, shown in detail in Fig. 4 of the drawings.

Fitted through the body is a pipe section 14. This pipe section, at its outer extremity, is screw threaded or otherwise formed for engagement with the main pipe line and, at its inner extremity, is flared to provide a substantially semi-spherical socket 15 adapted to engage snugly against the beveled seat of the shoulder 11.

Seating at one side within the socket 15 of the pipe section 14 is a substantially spherical bearing member or union 16. This bearing member is formed with a diametric opening 17 which is flared or diametrically enlarged, at its extremities for a purpose which will presently appear, and is provided with a circumscribing radial flange 18 arranged in a plane at substantially right angles to the said opening.

Arranged to coöperate with the pipe section 14, is a second pipe section 19. This latter pipe section is, as in the instance of the pipe section 14, screw threaded or otherwise formed at its outer extremity for engagement with a main pipe line and at its inner extremity is flared to provide a substantially semi-spherical socket 20 similar to the socket 15. The socket 20 is disposed to seat against the side of the bearing member 16 opposite the socket 15 with the flange 18 of the said bearing member arranged between the confronting ends of the said sockets and with the opening 18 through the said bearing member establishing communication between the pipe sections 14 and 19.

Screw threaded into the adjacent end of the body 10 to surround the pipe section 19, is a locking ring 21 provided with an inner curved face or seat to engage the socket 20 of the said pipe section with the said locking ring thus holding the pipe section 19, the bearing member 16 and the pipe section 14 connected with the body 10. Formed in the inner face of the locking ring is an annular channel or groove 22 and loosely fitted in this groove is a split resilient tensioning ring or member 23 identical with the ring 13. The rings 13 and 23 are of such diameter that when the locking ring 21 is adjusted within the body 10 to seat against the socket 20 of the pipe section 19 and shift the socket 15 of the pipe section 14 to seat against the shoulder 11, the said rings will be spread or expanded around the sockets 15 and 20 to thus exert a resilient action thereon tending to yieldably hold the said sockets tightly in engagement with the bearing member 16. We thus provide a coupling wherein the use of packing or gaskets is eliminated while, at the same time, a tight joint will always be maintained between the coacting pipe sections of the coupling.

As will now be readily understood, the pipe section 14 may be rotated or oscillated upon the bearing member 16 independently of the pipe section 19 and in like manner, the pipe section 19 may be rotated or oscillated upon the said bearing member independently of the pipe section 14. A flexible connection is thus produced between the said pipe sections. In this connection, attention is directed to the fact that the flange 18 of the bearing member 16 is disposed for engagement with the confronting edges of the sockets of the pipe sections to prevent the rotation of the bearing member within the said sockets so that this flange will act to always hold the bearing member in position with the opening 17 therethrough registering with the openings through the pipe sections. Since the pipe sections are mounted to oscillate independently of the bearing member to respectively assume a position at an angle to the axis of the opening 17 through the said member, as shown in dotted lines in Fig. 1, the extremities of the said opening are enlarged so that the said opening will always co-incide with the openings through the said pipe sections. The purpose in this construction, therefore, now becomes apparent and it will be seen that by the arrangement shown, unobstructed passage between the pipe sections through the bearing member will always be had. Furthermore, attention is also directed to the fact that the rings 13 and 22 will yieldably bear against the sockets of the pipe sections to tension these sections in their rotary and oscillatory movements so that unnecessary play or looseness of the said pipe sections will be effectually eliminated.

Having thus described the invention, what is claimed as new is:

1. A flexible pipe coupling including a body, coacting pipe sections fitted therein and provided with confronting sockets, a bearing member fitted in said sockets and interposed between the pipe sections, the said bearing member being provided with an opening communicating with the said sections, resilient tensioning members operatively connected with the body to surround the said sockets, and means adjustable upon the body for expanding the said members about the sockets, one of the said tensioning members being carried by the said means.

2. A flexible pipe coupling including a body, a shoulder formed on one extremity of the body and provided with a groove, coacting pipe sections fitted in the body and provided with confronting sockets, the socket of one of said sections being disposed to engage said shoulder, a bearing member fitted in said sockets and interposed between the said pipe sections, the said bearing member being provided with an opening communicating with the said sections, a grooved locking ring connecting the pipe sections with the body and disposed to engage the socket of the other of said pipe sections, and split resilient tensioning rings seated in said grooves and arranged to yieldably bear against the said sockets.

3. A flexible pipe coupling including a body, coacting pipe sections fitted therein and provided with confronting sockets, a bearing member fitted in said sockets and interposed between the pipe sections, the said bearing member being provided with an opening communicating with the said sections, resilient tensioning members operatively connected with the body to engage the sockets of said pipe sections, one of the said members being held against movement axially of the body, and means connecting the said pipe sections with the body.

4. A flexible pipe coupling including a body, coacting pipe sections fitted therein and provided with confronting sockets, a bearing member fitted in said sockets and interposed between the pipe sections, the said bearing member being provided with an opening, communicating with the said sections, resilient tensioning members operatively connected with the body to engage the sockets of said pipe sections, one of the said tensioning members being held against movement axially of the body and the other being movable axially of the body, and means connecting the said pipe sections with the body.

5. A flexible pipe coupling including a body, coacting pipe sections fitted therein and provided with confronting sockets, a bearing member fitted in said sockets and interposed between the pipe sections, the said bearing member being provided with an opening communicating with the said sections resilient tensioning members operatively connected with the body to engage the said sockets, and means adjustable upon the body for varying the tension of both the said members.

6. A flexible pipe coupling including a body, coacting pipe sections fitted therein and provided with confronting sockets, a bearing member fitted in said sockets and interposed between the pipe sections, the said bearing member being provided with an opening communicating with the said sections, resilient tensioning members operatively connected with the body to engage the said sockets, and a common means adjustable for simultaneously varying the tension of both of the said members.

7. A flexible pipe coupling including a body, coacting pipe sections fitted therein and provided with confronting sockets, a bearing member fitted in said sockets and interposed between the pipe sections, the said bearing member being provided with an opening communicating with the pipe sections and having enlarged ends, and means carried by the bearing member between the inner extremities of the said sockets and disposed for engagement thereby to maintain the bearing member in operative relation to the said pipe sections with the enlarged ends of the said opening establishing uninterrupted communication between the pipe sections.

8. A flexible pipe coupling including a body, a pipe section fitted therein and provided with a socket, a bearing member fitting in said socket and provided with an opening communicating with the pipe section, and resilient tensioning means operatively connected with the body to engage the socket of the said pipe section.

In testimony whereof we affix our signatures.

GEORGE H. LANGTON. [L. S.]
JOHN W. SMALL. [L. S.]